US009338698B2

(12) United States Patent
Huang

(10) Patent No.: US 9,338,698 B2
(45) Date of Patent: May 10, 2016

(54) METHOD AND ENODEB FOR FORWARDING DOWNLINK AND UPLINK PACKETS BASED ON S1 HANDOVER

(71) Applicant: Huawei Technologies Co., Ltd., Shenzhen (CN)

(72) Inventor: Ying Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/661,905

(22) Filed: Mar. 18, 2015

(65) Prior Publication Data

US 2015/0195749 A1    Jul. 9, 2015

Related U.S. Application Data

(63) Continuation of application No. 13/276,782, filed on Oct. 19, 2011, now Pat. No. 9,014,139, which is a continuation of application No. 12/732,807, filed on Mar. 26, 2010, now abandoned, which is a continuation of application No. PCT/CN2008/072570, filed on Sep. 27, 2008.

(30) Foreign Application Priority Data

Sep. 29, 2007    (CN) .......................... 2007 1 0175412

(51) Int. Cl.
*H04W 36/00*    (2009.01)
*H04W 36/02*    (2009.01)
(Continued)

(52) U.S. Cl.
CPC .......... *H04W 36/0011* (2013.01); *H04W 36/02* (2013.01); *H04W 72/12* (2013.01); *H04W 80/02* (2013.01); *H04W 88/04* (2013.01)

(58) Field of Classification Search
CPC ..... H04W 36/02; H04W 72/12; H04W 80/02; H04W 88/04
See application file for complete search history.

(56) References Cited

U.S. PATENT DOCUMENTS

| 5,940,371 A | 8/1999 | Mitts et al. |
| 2005/0073988 A1 | 4/2005 | Kroth et al. |

(Continued)

FOREIGN PATENT DOCUMENTS

| CN | 1156945 A | 8/1997 |
| CN | 1606894 A | 4/2005 |

(Continued)

OTHER PUBLICATIONS

Nokia Siemens Networks, "Data Forwarding Mechanism Over X2 and S1 Interface", Agenda Item 13.3.1a, 3GPP TSG-RAN WG3 Meeting #57, R3-071573, Athens, Greece, Aug. 20-24, 2007.*

(Continued)

*Primary Examiner* — Albert T Chou
(74) *Attorney, Agent, or Firm* — Leydig, Voit & Mayer, Ltd.

(57) ABSTRACT

A method for forwarding downlink packets based on S1 handover is disclosed. The method includes: numbering a packet not processed by using PDCP according to a message that comprises PDCP Serial Number (SN) information if downlink packets to be forwarded include the packet not processed by using PDCP; and sending the downlink packets to the UE according to the PDCP SN corresponding to the packet included in the downlink packets. A method for forwarding uplink packets based on S1 handover is disclosed. The method includes: receiving state report information of the packet sent by the target eNodeB; and sending the packet according to the state report information of the packet. Another method for forwarding downlink packets based on S1 handover and an eNodeB are disclosed. Through the embodiments of the present disclosure, the packets are forwarded without loss in the case of S1 handover.

10 Claims, 11 Drawing Sheets

(51) Int. Cl.
  *H04W 72/12* (2009.01)
  *H04W 80/02* (2009.01)
  *H04W 88/04* (2009.01)

(56) References Cited

U.S. PATENT DOCUMENTS

| | | | |
|---|---|---|---|
| 2008/0010677 A1* | 1/2008 | Kashima et al. | 726/12 |
| 2008/0188223 A1* | 8/2008 | Vesterinen et al. | 455/436 |
| 2010/0002650 A1* | 1/2010 | Ahluwalia | 370/331 |

FOREIGN PATENT DOCUMENTS

| | | |
|---|---|---|
| CN | 1933664 A | 3/2007 |
| CN | 1997220 A | 7/2007 |
| CN | 101043720 A | 9/2007 |
| CN | 101047967 A | 10/2007 |
| CN | 101047975 A | 10/2007 |
| CN | 101047998 A | 10/2007 |
| CN | 101132609 A | 2/2008 |
| CN | 101365168 A | 2/2009 |
| CN | 101132609 B | 4/2010 |
| CN | 101047998 B | 5/2010 |
| CN | 101047967 B | 12/2010 |
| CN | 101400156 B | 6/2012 |
| KR | 20030046006 A | 6/2003 |
| WO | WO 2007066882 A1 | 6/2007 |
| WO | WO 2007089560 A1 | 8/2007 |

OTHER PUBLICATIONS

Office Action in corresponding U.S. Appl. No. 12/732,807 (Dec. 7, 2011).
Office Action in corresponding U.S. Appl. No. 13/276,782 (Dec. 2, 2011).
"DL Data Forwarding" 3GPP TSG-RAN2 Meeting #59, Athens, Greece, R2-073360, 3$^{rd}$ Generation Partnership Project, Valbonne, France (Aug. 20-24, 2007).
"Downlink Data Forwarding for Mobility" 3GPP TSG-RAN3 Meeting #57, Athens, Greece, R3-071367, 3$^{rd}$ Generation Partnership Project, Valbonne, France (Aug. 20-24, 2007).
"Using GTP-U Header Fields for PDCP SN Forwarding on X2 andS1 Interface" 3GPP TSG-RAN WG3 Meeting #57, Athens, Greece, R3-071574, 3$^{rd}$ Generation Partnership Project, Valbonne, France (Aug. 20-24, 2007).
"DL User Data Forwarding in X2 HO" 13.3.1a. 3GPP TSG RAN WG3 Meeting #57, Athens, Greece, R3-071465, 3$^{rd}$ Generation Partnership Project, Valbonne, France (Aug. 20-24, 2007).
"PDCP SN Continuation for DL Data Forwarding During Handover," 3GPP TSG-RAN3 Meeting #57, Athens, Greece, R3-071352, 3$^{rd}$ Generation Partnership Project, Valbonne, France (Aug. 20-24, 2007).
"Data Forwarding Mechanism Over X2 and S1 Interface," 3GPP TSG-RAN WG3 Meeting #57, Athens, Greece, R3-071573, 3$^{rd}$ Generation Partnership Project, Valbonne, France (Aug. 20-24, 2007).
"3$^{rd}$ Generation Partnership Project; Technical Specification Group Radio Access Network; Evolved Universal Terrestrial Access Network (E-UTRAN); S1 Application Protocol (S1AP) (Release 8)," 3GPP TS 36.413, V1.0.0, 3$^{rd}$ Generation Partnership Project, Valbonne, France (Sep. 2007).
"3$^{rd}$ Generation Partnership Project; Technical Specification Group Radio Access Network; Evolved Universal Terrestrial Access (E-UTRA) and Evolved Universal Terrestrial Radio Access Network (E-UTRAN); Overall Description; Stage 2 (Release 8)," 3GPP TS 36.300, V8.1.0, 3$^{rd}$ Generation Partnership Project, Valbonne, France (Jun. 2007).
"3$^{rd}$ Generation Partnership Project; Technical Specification Group Services and System Aspects; GPRS enhancements for E-UTRAN access (Release 8)," 3GPP TS 23.401, V1.2.1, 3$^{rd}$ Generation Partnership Project, Valbonne, France (Sep. 2007).
U.S. Appl. No. 13/276,782, filed Oct. 19, 2011.
U.S. Appl. No. 12/732,807, filed Mar. 26, 2010.
"Forwarding of UL Data during Intra-LTE HO," 3GPP TSG-RAN WG3, Meeting #57, Athens, Greece, R3-071502, 3$^{rd}$ Generation Partnership Project, Valbonne, France (Aug. 20-24, 2007).
"New X2-AP Message to Transfer PDCP-SN Status at Mobility," 3GPP TSG-RAN WG3, Meeting #57, Athens, Greece, R3-071504, 3$^{rd}$ Generation Partnership Project, Valbonne, France (Aug. 20-24, 2007).
"PDCP SN indication from source eNB during Inter-eNB HO," 3GPP TSG-RAN WG3, Meeting #57, Athens, Greece, R3-071456, 3$^{rd}$ Generation Partnership Project, Valbonne, France (Aug. 20-24, 2007).

* cited by examiner

METHOD AND ENODEB FOR FORWARDING DOWNLINK AND UPLINK PACKETS BASED ON S1 HANDOVER

CROSS-REFERENCE TO RELATED APPLICATIONS

This application is a continuation of U.S. patent application Ser. No. 13/276,782, filed Oct. 19, 2011, which is a continuation of U.S. patent application Ser. No. 12/732,807, filed Mar. 26, 2010, which is a continuation of International Patent Application No. PCT/CN2008/072570, filed Sep. 27, 2008. The International Patent Application claims priority to Chinese Patent Application No. 200710175412.9, filed Sep. 29, 2007. The aforementioned patent applications are hereby incorporated by reference in their entireties herein.

TECHNICAL FIELD

The present disclosure relates to the radio communications field, and in particular, to a method for forwarding downlink and uplink packets based on S1 handover, and to an evolved NodeB (eNodeB).

BACKGROUND

The Long Term Evolution (LTE) system is in a flattened Radio Access Network (RAN) structure, and requires no Radio Network Controller (RNC). FIG. 1 shows a structure of an LTE system. As shown in FIG. 1, the LTE RAN includes an eNodeB and an Evolved Packet Core (EPC). The eNodeB evolves from the NodeB and the RNC in the R6 stage, and different eNodeB's are interconnected through an X2 interface in the mesh mode. The interface between the eNodeB and the EPC is called an S1 interface. An EPC includes a Mobility Management Entity (MME) and a System Architecture Evolution (SAE) GateWay (SGW). As a control plane part, the MME is responsible for the control plane mobility management, including user context and mobility state management, and allocation of a Temporary Mobile Subscriber Identifier (TMSI). As a user plane part, the SGW is responsible for initiating paging for the downlink data in the idle state, and managing and storing the Internet Protocol (IP) bearer parameters and intra-network routing information, and so on. The MME is connected with the SGW in a mesh mode. That is, one MME controls multiple SGWs. The S1 interface supports many-to-many connection relationships between the EPC and the eNodeB.

FIG. 2 shows a user-plane protocol stack of an LTE system specific to the LTE structure shown in FIG. 1. Generally, all functions of the RNC in the existing network are located to the eNodeB so that the eNodeB has all radio interface protocol stacks. As shown in FIG. 2, the user-plane protocol stack of the evolved architecture of the layer-2 node includes a User Equipment (UE) user-plane protocol stack, an eNodeB user-plane stack protocol, and an SGW user-plane protocol stack. The UE communicates with the eNodeB through a Uu interface, and the eNodeB communicates with the SGW through an S1 interface.

The SGW user-plane protocol stack includes: a GPRS Tunneling Protocol-User plane (GTP-U) layer, a User Datagram Protocol/Internet Protocol (UDP/IP) layer, an L2 layer, and an L1 layer.

The eNodeB user protocol stack includes a radio interface protocol stack and an S1 interface protocol stack. The radio interface protocol stack includes: a Packet Data Convergence Protocol (PDCP) layer, a Radio Link Control (RLC) layer, a Media Access Control (MAC) layer, and an L1 layer. The S1 interface protocol stack includes: a GTP-U layer, a UDP/IP layer, an L2 layer, and an L1 layer.

The UE user-plane protocol stack includes: a PDCP layer, an RLC layer, a MAC layer, and an L1 layer.

The L2 layer refers to layer 2 in the layered protocol, namely, the data link layer, which includes frame relay, Asynchronous Transfer Mode (ATM), or a radio data link layer. The L1 mentioned above refers to layer 1 in the layered protocol, namely, the physical layer, which includes E1, fiber, and microwave transport.

In the S1 handover process in an LTE system, in order to reduce packet loss, the packet forwarding method based on S1 handover is generally applied. However, in the process of forwarding the data, the target eNodeB is unable to ensure the data forwarding of the target eNodeB to be orderly, and is hence unable to ensure lossless migration of packets.

SUMMARY

The first aspect of the present disclosure is to provide a method for forwarding downlink packets based on S1 handover, to prevent or reduce loss of downlink packets in the S1 handover, and thus to accomplish forwarding of downlink packets without loss.

The second aspect of the present disclosure is to provide a method for forwarding uplink packets based on S1 handover, to prevent or reduce loss of uplink packets in the S1 handover, and thus to accomplish forwarding of uplink packets without loss.

In order to fulfill the first aspect of the present disclosure, a method for forwarding downlink packets based on S1 handover is disclosed in an embodiment of the present disclosure. The method includes: numbering a packet not processed by using PDCP according to a message that carries PDCP Serial Number (SN) information if downlink packets to be forwarded include the packet not processed by using PDCP; and sending the downlink packets to a UE according to the PDCNs of packages included in the downlink packets.

In order to fulfill the first aspect of the present disclosure, another method for forwarding downlink packets based on S1 handover is disclosed in an embodiment of the present disclosure. The method includes: performing PDCP SN numbering for a packet delivered by the target SGW by using PDCP SN of a special packet as an initial PDCP SN when the downlink packets to be transmitted include the packet delivered by the target SGW, where the PDCP SN of the special packet is obtained after the source eNodeB numbers the special packet, and the special packet is obtained by the source eNodeB when the source SGW stops sending packets; and forwarding the downlink packets to a UE according to the PDCNs of packages included in the downlink packets.

In the foregoing methods for forwarding downlink packets based on S1 handover, the packet not processed by using PDCP is numbered according to the message that carries PDCP SN information of the packet, or the packet delivered by the target SGW is numbered according to the PDCP SN of the special packet. Therefore, the UE can receive downlink packets sequentially in the case of S1 handover, and the downlink packets can be forwarded without loss.

In order to fulfill the second aspect of the present disclosure, a method for forwarding uplink packets based on S1 handover is disclosed in an embodiment of the present disclosure. The method includes: receiving state report information of a packet sent by a target eNodeB; and sending the packet according to the state report information of the packet.

In the foregoing method for forwarding uplink packets based on S1 handover, the target eNodeB sends the packet state report information to the UE, thus ensuring that the UE sends the packet according to the packet state report information in the case of S1 handover, and accomplishing forwarding of the uplink packets without loss.

An eNodeB is disclosed in an embodiment of the present disclosure. When the eNodeB serves as a target eNodeB, the eNodeB includes: a receiving module, adapted to receive a message that includes PDCP SN information; and a sorting module, connected with the receiving module and adapted to perform PDCP SN numbering for a packet according to the message.

A communication system is disclosed in an embodiment of the present disclosure. When the communication system includes the eNodeB and the eNodeB serves as a target eNodeB, the eNodeB includes: a receiving module, adapted to receive a message that includes PDCP SN information; and a sorting module, connected with the receiving module and adapted to perform PDCP SN numbering for a packet according to the message.

Through a receiving module and a sorting module, the foregoing eNodeB performs PDCP SN numbering for packets and ensures forwarding of the packets without loss.

DETAILED DESCRIPTION

The present disclosure is detailed below by reference to the accompanying drawings and exemplary embodiments.

In the embodiments of the present disclosure, in order to ensure lossless migration of packets, it is necessary to transfer the packets unconfirmed and buffered in the source eNodeB and the packets not processed in time. For downlink packets, the packets received by the target eNodeB may be forwarded from the source eNodeB, or delivered from the target SGW. The UE receives packets sequentially according to PDCP SNs. Therefore, the target eNodeB needs to assign a PDCP SN to each received packet. In this way, packet loss is avoided or reduced, and lossless migration of the downlink packets is ensured. For uplink packets, the target eNodeB knows which packets from the source eNodeB fail to be received, and instructs the UE to retransmit such packets, thus ensuring lossless transfer of the uplink packets.

Figure 1:
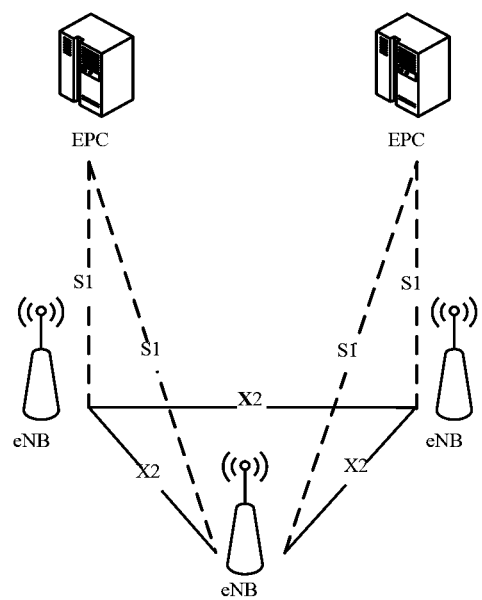
FIG. 1 shows a structure of an LTE system.
Figure 2:
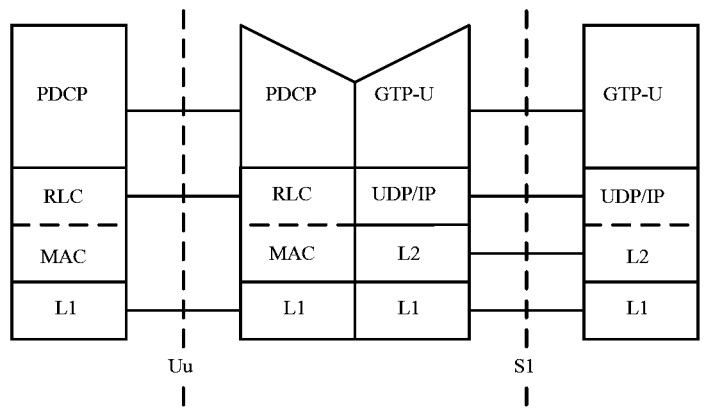
FIG. 2 shows a user-plane protocol stack of an LTE system.
Figure 3:
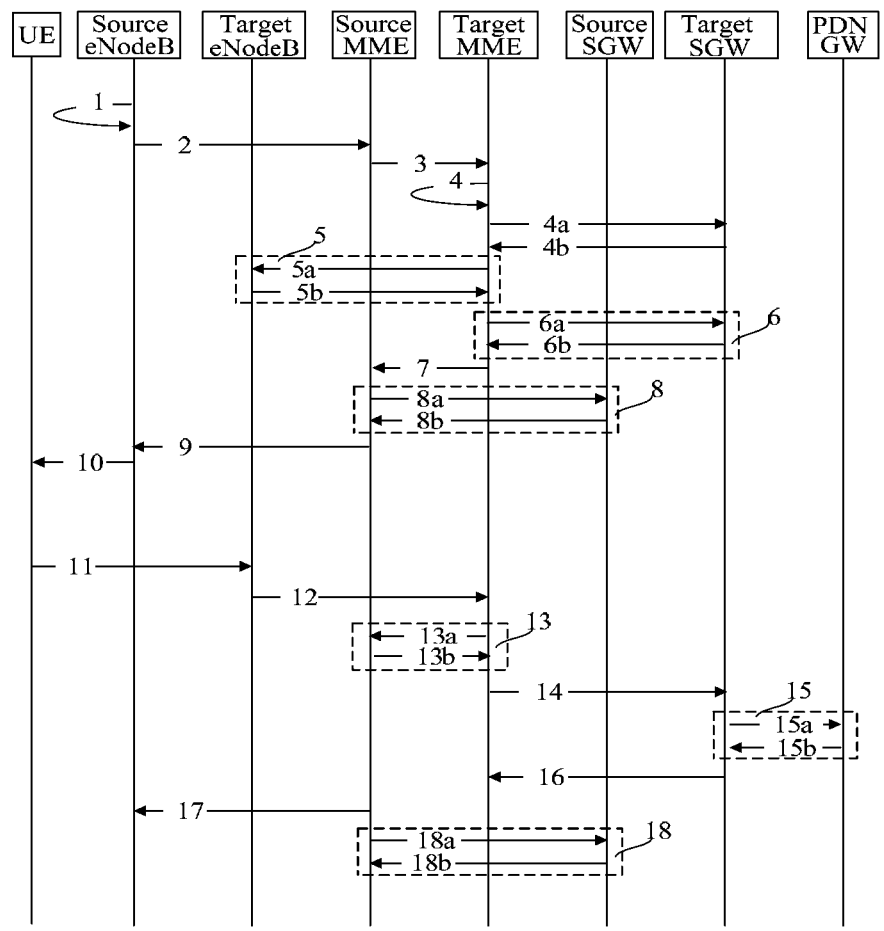
FIG. 3 is a flowchart based on S1 handover.

FIG. 3 is a flowchart based on S1 handover. The flow includes the following steps:

Step 1: According to the handover algorithm, the source eNodeB decides to trigger handover through an S1 interface.

Step 2: The source eNodeB sends a Relocation Request message to a source MME.

Step 3: The source MME selects a target MME to which a Forward Relocation Request message is sent.

Step 4: The target MME checks whether the current target SGW can continue to serve the UE. If the current target SGW can continue to serve the UE, the process proceeds to step 5; if the current target SGW cannot continue to serve the UE, the target MME selects a new target SGW which forwards the packet indirectly. That is, the target SGW of the core network is relocated. Step 4a and step 4b are performed.

Step 4a: The target MME sends a Create Bearer Request message to the new target SGW.

Step 4b: The new target SGW sends a Create Bearer Response message to the target MME.

Step 5: The target MME sends the Relocation Request message to the target eNodeB, and receives a Relocation Response from the eNodeB. Specifically, step 5a: the target MME sends a Relocation Request message to the target eNodeB; and step 5b: the target eNodeB generates a context which includes bearer information and security context information, and sends a Relocation Response to the target MME.

Step 7: The target MME sends the Relocation Response to the source MME. If the target SGW of the core network is relocated, the following step 6 occurs between step 5 and step 7:

Step 6: The target MME notifies the new target SGW of the relevant parameter information. Specifically, step 6 includes:

Step 6a: The target MME sends an Update Bearer Request message to the target SGW. The message notifies the new target SGW of the relevant parameter information.

Step 6b: The new target SGW sends an Update Bearer Response message to the target MME.

If the source SGW of the core network is relocated, the following step 8 occurs after step 7.

Step 8: The source MME updates the tunnel information of the source SGW. Specifically, step 8 includes:

Step 8a: The source MME sends an Update Bearer Request message to the source SGW.

Step 8b: The source SGW sends an Update Bearer Response message to the source MME.

Step 9: The source MME sends a Relocation Command message to the source eNodeB.

Step 10: The source eNodeB sends a Handover Command message to the UE.

Step 11: After the UE is synchronized to the target cell successfully, the UE sends a Handover Confirm message to the target eNodeB. The target eNodeB sends downlink data forwarded by the source eNodeB to the UE, and the UE may send uplink data to the target SGW.

Step 12: The target eNodeB sends a Relocation Complete message to the target MME.

Step 13: The target MME sends a Forward Relocation Complete message to the source MME, and receives a Forward Relocation Complete Acknowledge message from the source MME. Specifically, step 13 includes:

Step 13a: The target MME sends a Forward Relocation Complete message to the source MME.

Step 13b: The source MME sends a Forward Relocation Complete Acknowledge message to the target MME.

Step 14: The target MME sends an Update Bearer Request message to the target SGW.

Step 16: The target SGW sends an Update Bearer Response message to the target MME.

If the new target SGW is applied, it indicates that the target SGW is relocated, and the following step 15 occurs between step 14 and step 16:

Step 15: The new target SGW notifies the Packet Data Network Gate Way (PDN GW) of the new tunnel and address. Specifically, step 15a: The new target SGW sends an Update Bearer Request message to the PDN GW; and step 15b: The new target SGW sends an Update Bearer Response message to the target MME.

Step 17: The source MME receives the Forward Relocation Complete message, and sends a Release Resource message to the source eNodeB. The source eNodeB releases all resources.

If the source SGW of the core network is relocated, the following step 18 occurs:

Step 18: The source MME sends a Delete Bearer Request message to the source SGW. Specifically, step 18a: The source MME sends a Delete Bearer Request message to the source SGW; and step 18b: The source SGW sends a Delete Bearer Response message to the source MME.

In the embodiments of the present disclosure, the downlink packets received by the target eNodeB include the packets forwarded by the source eNodeB and the packets delivered by the target SGW. The packets forwarded by the source eNodeB include the packets processed through the PDCP and the packets not processed through the PDCP. In the packets forwarded by the source eNodeB, each packet processed through the PDCP carries a PDCP SN. The packets not processed through the PDCP carry no PDCP SN; and the packets delivered by the target SGW carry no PDCP SN. It is assumed that the packets processed through the PDCP in the source eNodeB are category-1 packets; the packets not processed through the PDCP in the source eNodeB are category-2 packets; and the packets delivered by the target SGW are category-3 packets.

It is possible that all the category-1 packets of the source eNodeB are sent to the UE before handover. At the beginning of the handover, the source eNodeB receives responses to only some category-1 packets from the UE. The responses indicate that the UE has received such category-1 packets. Therefore, in order to save forwarding resources, such category-1 packets are not forwarded, and only the category-1 packets to which the UE makes no response are forwarded.

After the target eNodeB receives category-1 packets, because category-1 packets carry PDCP SNs, they carry the old PDCP SNs and are sent to the UE; if the received packets are category-2 packets and/or category-3 packets, because such packets carry no PDCP SN, the target eNodeB needs to assign a PDCP SN to each packet before sending such packets to the UE. In this way, it is ensured that the UE receives the packets sequentially according to the PDCP SN.

The following embodiments 1-6 of the method for forwarding downlink packets based on S1 handover describe how the target eNodeB performs PDCP SN numbering for category-2 packets and category-3 packets so that the UE can receive downlink packets sequentially according to PDCP SN and accomplish lossless migration of downlink packets.

The target eNodeB performs PDCP SN numbering for category-2 packets and category-3 packets in the following modes:

(1) The target eNodeB performs PDCP SN numbering for category-2 packets and category-3 packets according to the received message that carries PDCP SN information of a packet. The following embodiments 1-5 describe this mode.

(2) When the target eNodeB receives a special packet from the source eNodeB, the target eNodeB performs PDCP SN numbering for category-3 packets by using PDCP SN of the special packet as an initial PDCP SN. The following embodiment 6 describes this mode.

Embodiment 1

In this embodiment, the message that carries the PDCP SN information of a packet is a Relocation Request message, and the PDCP SN information of a packet is information about the relationship between the PDCP SN and the GTP-U SN.

As shown in FIG. 3, after step 2, it is evident that no more downlink packet can be sent to the source eNodeB. In this embodiment, when the source eNodeB decides to send a Relocation Request message, the Relocation Request message carries information about the relationship between the PDCP SN and the GTP-U SN, for example, a specific value of the PDCP SN and a specific value of the GTP-U SN of the packet, or the corresponding relationship between the PDCP SN and the GTP-U SN. If the target SGW adds a GTP-U SN into a category-3 packet when delivering the packet, a PDCP SN can be assigned to each category-3 packet according to the relationship between the PDCP SN and the GTP-U SN.

The category-2 packet forwarded by the source eNodeB may also carry the old S1 interface GTP-U SN. In this way, it is ensured that the target eNodeB sequentially receives the packets forwarded by the source eNodeB. The category-2 packet forwarded by the source eNodeB may carry no old S1 interface GTP-U SN, and, by default, the target eNodeB believes that the category-2 packets forwarded by the source eNodeB arrive sequentially.

For category-2 packets forwarded by the source eNodeB, the target eNodeB may assign a PDCP SN to each packet according to the order of receiving the packets. If the category-2 packets forwarded by the source eNodeB carry old S1 interface GTP-U SNs, the target eNodeB may assign a PDCP SN to each category-2 packet according to the relationship between the PDCP SN and the GTP-U SN.

An exemplary solution to implementing this embodiment is as follows: It is possible that all the category-1 packets whose PDCP SNs are 1, 2, 3, and 4 in the source eNodeB are sent by the source eNodeB to the UE, but only the category-1 packets whose PDCP SNs are 1 and 4 are responded to. Therefore, the source eNodeB forwards only the category-1 packets whose PDCP SNs are 2 and 3" to the target eNodeB. Every packet processed through the PDCP carries a PDCP SN, for example, carries category-1 packets whose PDCP SNs are 2 and 3; and the packets not processed through the PDCP carry no PDCP SN.

It is possible that the source eNodeB carries not only the category-1 packets processed through the PDCP, but also the category-2 packets not processed through the PDCP. The source eNodeB needs to forward such two types of packets to the target eNodeB.

When the source eNodeB decides to send a Relocation Request message, the Relocation Request message carries information about the relationship between the PDCP SN and the GTP-U SN. In this embodiment, the information about the relationship between the PDCP SN and the GTP-U SN is the corresponding relationship between the PDCP SN and the GTP-U SN. This corresponding relationship may be calculated out according to the specific values of the PDCP SNs and the GTP-U SNs in the category-1 packets. For example, if a category-1 packet has a PDCP SN being 2 and a GTP-U SN being 10, the corresponding relationship between the PDCP SN and the GTP-U SN may be expressed as "PDCP SN=GTP-U SN-8". If the category-3 packets delivered by the target SGW carry GTP-U SN=15, 16, 17, . . . , then the corresponding relationship may be expressed as "PDCP SN=GTP-U SN-8" according to the corresponding relationship between the PDCP SN and the GTP-U SN, and the category-3 packets whose PDCP SNs are 7, 8, 9, . . . .

For the category-2 packets forwarded by the source eNodeB, the target eNodeB may assign a PDCP SN to each packet according to the order of receiving the packets. When the category-2 packets forwarded by the source eNodeB carry the old S1 interface GTP-U SNs, a PDCP SN may also be assigned to each category-2 packet according to the relationship between the PDCP SN and the GTP-U SN. For example, if "GTP-U SN=13, 14" for category-2 packets, the relationship may be expressed as "PDCP SN=GTP-U SN-8" according to the corresponding relationship between the PDCP SN and the GTP-U SN, and the category-3 packets whose PDCP SNs are 5 and 6.

In this embodiment, when the source eNodeB decides to send a Relocation Request message, the Relocation Request message carries the information about the relationship between the PDCP SN and the GTP-U SN. In this way, the category-3 packets from the target SGW can be numbered with the PDCP SNs. The merits of this solution are: The target eNodeB can assign a PDCP SN to each category-3 packet from the target SGW according to the relationship between the PDCP SN and the GTP-U SN, without waiting for completion of forwarding all data from the source eNodeB. Therefore, the efficiency of PDCP SN numbering is improved, and the delay of forwarding the packets is reduced.

Embodiment 2

In this embodiment, the message that carries the PDCP SN information of a packet is a Handover Confirm message, and the PDCP SN information of a packet is the maximum PDCP SN of the packet received by the UE.

After the UE is synchronized to the target cell successfully, the UE gets in touch with the target eNodeB, as shown in step 11 in FIG. 3. In this case, the target eNodeB starts a timer. The UE uses the Handover Confirm message in step 11 to notify the state of the received packet to the target eNodeB, including the maximum PDCP SN of the packet received by the UE.

The Handover Confirm message sent by the UE to the target eNodeB includes the maximum PDCP SN of the packet received by the UE. Specifically, the target eNodeB assigns a PDCP SN to each category-2 packet and each category-3 packet in this way: If a category-2 or category-3 packet carries a GTP-U SN, the target eNodeB assigns a PDCP SN to the packet according to the GTP-U SN of the category-2 or category-3 packet. If the category-2 or category-3 packet carries no GTP-U SN, the target eNodeB assigns a PDCP SN to the packet according to the order of receiving the category-2 or category-3 packet. The target eNodeB assigns a PDCP SN to each category-2 packet on the basis of maximum PDCP SN of the packet received by the UE, and assigns a PDCP SN to each category-3 packet on the basis of the maximum PDCP SN of the category-2 packets.

The Handover Confirm message sent by the UE to the target eNodeB carries the state information of the packet. The state information may include the PDCP SN of a non-received category-1 packet. Specifically, the target eNodeB sends the category-1 packet to the UE in this way: The target eNodeB forwards the category-1 packets which correspond to the PDCP SNs and are not received by the UE, to the UE, and discards all other category-1 packets.

An exemplary solution to implementing this embodiment is: It is possible that all the category-1 packets whose PDCP SNs are 1, 2, 3 and 4 in the source eNodeB are sent by the source eNodeB to the UE, but only the category-1 packets whose PDCP SNs are 1 and 4 are responded to. Therefore, the source eNodeB forwards only the category-1 packets whose PDCP SNs are 2 and 3 to the target eNodeB. Every packet processed through the PDCP carries a PDCP SN, for example, carries category-1 packets whose PDCP SNs are 2 and 3; and the packets not processed through the PDCP carry no PDCP SN.

It is possible that the source eNodeB carries not only the category-1 packet processed through the PDCP, but also the category-2 packet not processed through the PDCP. The source eNodeB needs to forward such two types of packets to the target eNodeB.

When sending a Handover Confirm message to the target eNodeB, the UE notifies the received packet state information to the target eNodeB. The state information may include the maximum PDCP SN of the received packets and the non-received PDCP SNs. For example, the state report information received by the target eNodeB is the maximum PDCP SN=5 received by the UE; meanwhile, the target eNodeB receives the PDCP SN=2 and PDCP SN=3 of the category-1 packets, and "GTP-U SN=5, 6" of the category-2 packets, and the "GTP-U SN=7, 8, 9, . . . " of the category-3 packets forwarded by the target SGW. According to the value of the GTP-U SN of the category-2 packets, the category-2 packets whose PDCP SNs are 6 and 7 on the basis of the maximum PDCP SN. Afterward, the category-3 packets delivered by the SGW whose PDCP SNs are 8, 9, 10, . . . . If the packet state information sent by the UE further covers the category-1 packets that receive no PDCP SN=2, the target eNodeB needs to resend the category-1 packets whose PDCP SNs is 2 to the UE, and discard the category-1 packets whose PDCP SNs is 3.

In the third, fourth and fifth embodiments, the message that carries the packet PDCP SN information is: a newly constructed control message sent by the source eNodeB through the source MME and the target MME to the target eNodeB; or a newly constructed control message sent by the source eNodeB through an X2 interface to the target eNodeB directly.

Embodiment 3

Figure 4:
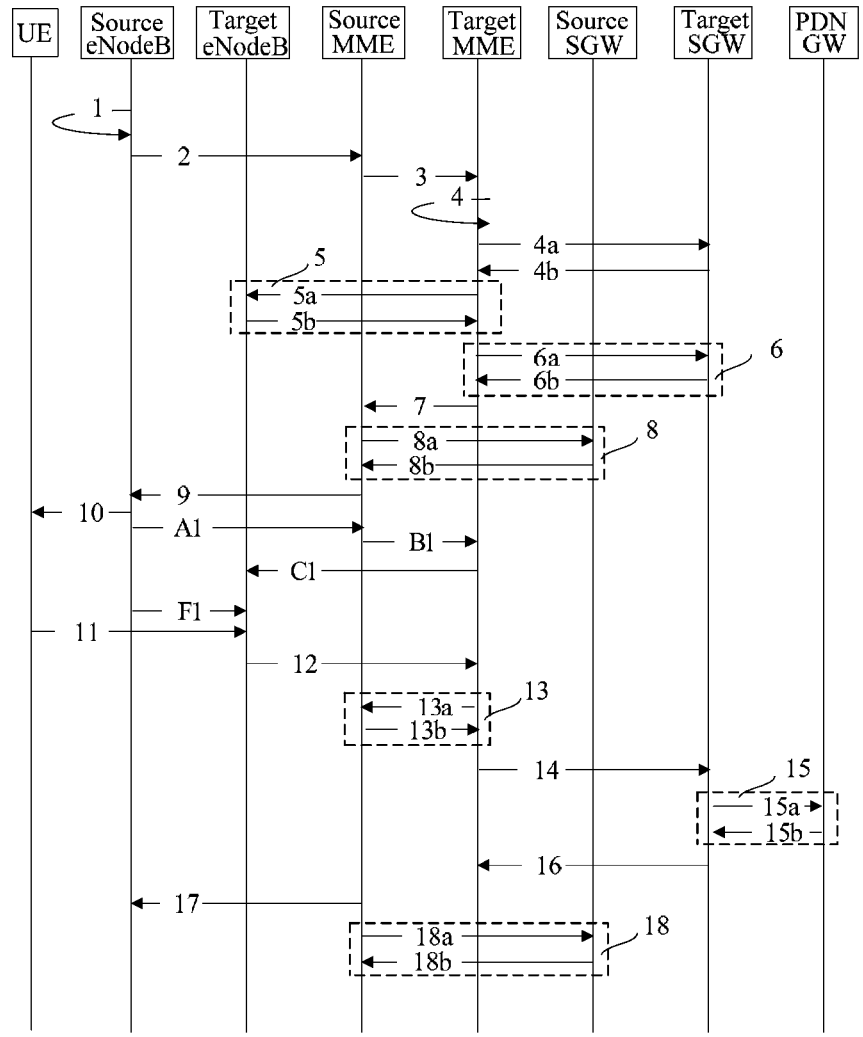
FIG. 4 is a flowchart of a method for forwarding downlink packets based on S1 handover in the third embodiment of the present disclosure.

As shown in FIG. 3, after the source eNodeB sends a Handover Command to the UE after step 10, the source eNodeB knows that the connection with the UE is interrupted and the data needs to be forwarded. FIG. 4 shows a method for forwarding downlink packets based on S1 handover in the third embodiment of the present disclosure. As shown in FIG. 4, after the source eNodeB sends a Handover Command to the UE in step 10 and before the UE sends a Handover Confirm message to the target eNodeB in step 11, the method further includes: a newly constructed control message is sent by the source eNodeB through the source MME and the target MME to the target eNodeB; or a newly constructed control message is sent by the source eNodeB through an X2 interface to the target eNodeB directly. The newly constructed control message carries the initial PDCP SN assigned by the target eNodeB, and the GTP-U SN corresponding to the PDCP SN. If the target SGW adds a GTP-U SN into the category-3 packet when delivering the packet, the target eNodeB may assign a PDCP SN to each category-3 packet according to the relationship between the PDCP SN and the GTP-U SN.

By means of an S1 interface, the source eNodeB sends an initial PDCP SN and the GTP-U SN corresponding to the PDCP SN to the target eNodeB through the source MME and the target MME, where the initial PDCP SN is the first PDCP SN assigned by the target eNodeB. The detailed steps are as follows:

Step A1: The source eNodeB sends an initial PDCP SN and the GTP-U SN corresponding to the PDCP SN to the source MME, where the initial PDCP SN is the first PDCP SN assigned by the target eNodeB.

Step B1: The source MME sends the initial PDCP SN and the GTP-U SN corresponding to the PDCP SN to the target MME, where the initial PDCP SN is the first PDCP SN assigned by the target eNodeB.

Step C1: The target MME sends the initial PDCP SN and the GTP-U SN corresponding to the PDCP SN to the target eNodeB, where the initial PDCP SN is the first PDCP SN assigned by the target eNodeB.

Alternatively, the source eNodeB sends an initial PDCP SN and the GTP-U SN corresponding to the PDCP SN to the target eNodeB through an X2 interface directly, where the initial PDCP SN is the first PDCP SN assigned by the target eNodeB. The detailed steps are as follows:

Step F1: The source eNodeB sends the initial PDCP SN and the GTP-U SN corresponding to the PDCP SN to the target eNodeB, where the initial PDCP SN is the first PDCP SN assigned by the target eNodeB.

If the target SGW adds a GTP-U SN into the category-3 packet when delivering the packet, the target eNodeB can assign a PDCP SN to each category-3 packet according to the relationship between the PDCP SN and the GTP-U SN.

The category-2 packet forwarded by the source eNodeB may also carry the old S1 interface GTP-U SN. In this way, it is ensured that the target eNodeB sequentially receives the packets forwarded by the source eNodeB. The category-2 packet forwarded by the source eNodeB may carry no old S1 interface GTP-U SN, and, by default, the target eNodeB believes that the category-2 packets forwarded by the source eNodeB arrive sequentially.

For category-2 packets forwarded by the source eNodeB, the target eNodeB may assign a PDCP SN to each packet according to the order of receiving the packets, and the category-2 packets are numbered directly through the initial PDCP SN which is the first PDCP SN assigned by the target eNodeB. If the category-2 packets forwarded by the source eNodeB carry an old S1 interface GTP-U SN, the target eNodeB may assign a PDCP SN to each category-2 packet according to the relationship between the PDCP SN and the GTP-U SN.

An exemplary solution to implementing this embodiment is: It is possible that all the category-1 packets whose PDCP SNs are 1, 2, 3 and 4 in the source eNodeB are sent by the source eNodeB to the UE, but only the category-1 packets whose PDCP SNs are 1 and 4 are responded to. Therefore, the source eNodeB forwards only the category-1 packets whose PDCP SNs are 2 and 3 to the target eNodeB. Every packet processed through the PDCP carries a PDCP SN, for example, carries category-1 packets whose PDCP SNs are 2 and 3 or category-1 packets forwarded to the target eNodeB and whose PDCP SNs are 2 and 3; and the packets not processed through the PDCP carry no PDCP SN.

It is possible that the source eNodeB carries not only the category-1 packet processed through the PDCP, but also the category-2 packet not processed through the PDCP. The source eNodeB needs to forward such two types of packets to the target eNodeB.

For the category-2 packets forwarded by the source eNodeB, the target eNodeB may assign a PDCP SN to each packet according to the order of receiving the packets, and the PDCP SN value carried in the [A1, B1, C1]/F1 control plane is applied directly. If the category-2 packets forwarded by the source eNodeB carry the old S1 interface GTP-U SN, the target eNodeB may assign a PDCP SN to each category-2 packet according to the relationship between the PDCP SN and the GTP-U SN.

In the control plane message in this solution, PDCP SN=5, and GTP-U SN=10. The target eNodeB starts numbering from PDCP SN=5. The GTP-U SNs of the packets delivered by the SGW are 12, 13, 14, . . . . Therefore, the target eNodeB numbers the category-3 packets with PDCP SN=7, 8, 9 . . . according to the relationship between the PDCP SN and the GTP-U SN in the control plane message. It is determined that two packets are forwarded from the source eNodeB. The packets which are forwarded from the source eNodeB and have no PDCP SN whose PDCP SNs are 5 and 6.

The merits of this solution are: The target eNodeB can number the packets delivered from the SGW directly, without waiting for completion of forwarding the data from the source eNodeB.

Embodiment 4

Figure 5:
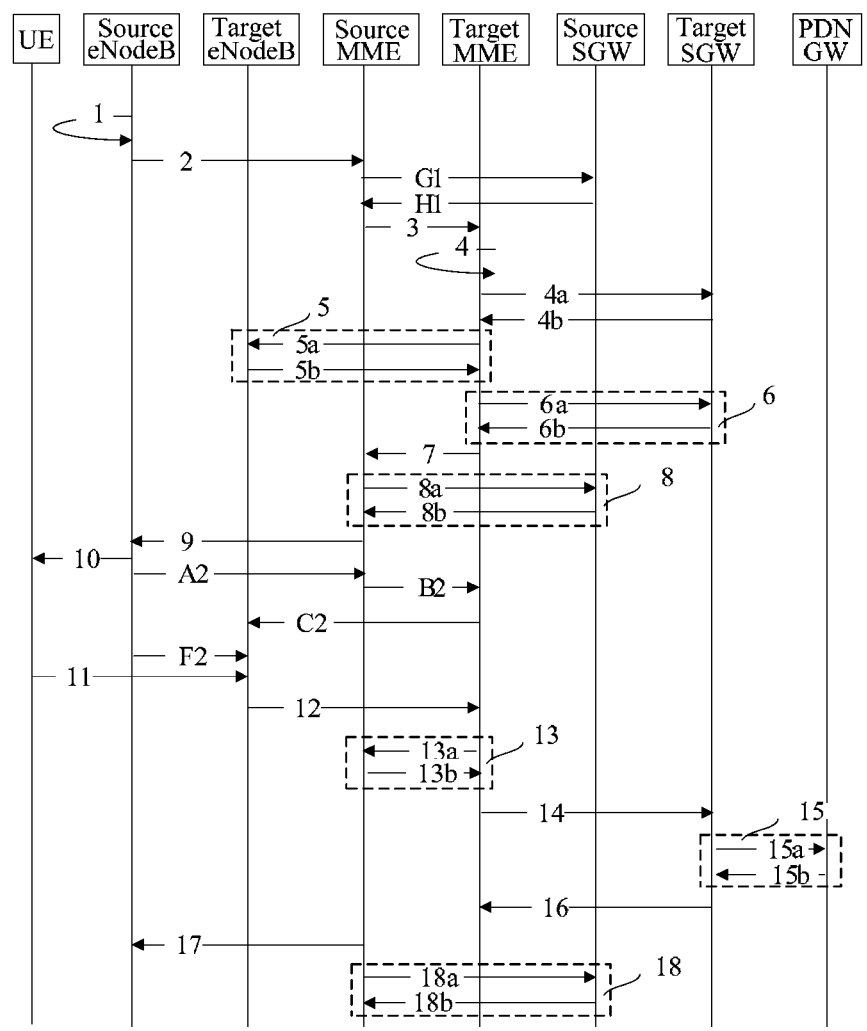
FIG. 5 is a flowchart of a method for forwarding downlink packets based on S1 handover in the fourth embodiment of the present disclosure.

As shown in FIG. 3, after the source eNodeB sends a Handover Command to the UE after step 10, the source eNodeB knows that the connection with the UE is interrupted and the data needs to be forwarded. FIG. 5 shows a method for forwarding downlink packets based on S1 handover in the fourth embodiment of the present disclosure. As shown in FIG. 4, after the source eNodeB sends a Handover Command to the UE in step 10 and before the UE sends a Handover Confirm message to the target eNodeB in step 11, the method further includes: a newly constructed control message is sent by the source eNodeB through the source MME and the target MME to the target eNodeB; or a newly constructed control message is sent by the source eNodeB through an X2 interface to the target eNodeB directly. The newly constructed control message carries the initial PDCP SN assigned by the target eNodeB.

The source eNodeB sends the initial PDCP SN through the source MME and the target MME to the target eNodeB. The detailed steps are as follows:

Step A2: The source eNodeB sends an initial PDCP SN to the source MME.

Step B2: The source MME sends the initial PDCP SN to the target MME.

Step C2: The target MME sends the initial PDCP SN to the target eNodeB.

Alternatively, the source eNodeB sends an initial PDCP SN through an X2 interface to the target eNodeB directly. The detailed steps are as follows:

Step F2: The source eNodeB sends the initial PDCP SN to the target eNodeB.

The target eNodeB assigns PDCP SNs to the category-2 packets in the following way:

The target eNodeB assigns PDCP SNs to the category-2 packets according to the initial PDCP SN according to the order of receiving the category-2 packets.

After the source eNodeB sends a Relocation Request message to the source MME and before the source MME sends a Handover Command to the source eNodeB, the following operations may be performed: The source SGW stops sending packets, and the source SGW sends a special packet to the source eNodeB. The source eNodeB may forward the special packet, or construct a new special packet and sends it to the target eNodeB. In order to avoid loss of user plane data, one or more special packets may be sent. For example, for the GTPU V1 protocol, the information carried in the special packet is set through the extended field of the GTP-U packet header. To construct a special packet in this solution, field 12 or field 11 in Table 1 may be marked as a special packet, and the special packet is set according to Table 3. The field in Table 4 includes a PDCP SN. Table 2 shows the extension of field 12 in Table 1. As shown in FIG. 5, the following steps may occur between step 2 and step 3:

Step G1: The source MME instructs the source SGW to stop sending packets.

Step H1: The source SGW answers the source MME.

Table 1 shows a GTP-U packet header structure.

TABLE 1

| Octets | Bits | | | | | | | |
|---|---|---|---|---|---|---|---|---|
| | 8 | 7 | 6 | 5 | 4 | 3 | 2 | 1 |
| 1 | Version | | PT | (*) | E | | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet)1) 4) | | | | | | | |
| 10 | Sequence Number (2nd Octet)1) 4) | | | | | | | |
| 11 | N-PDU Number2) 4) | | | | | | | |
| 12 | Next Extension Header Type3) 4) | | | | | | | |

1: "version" refers to the version; "PT" refers to the protocol type; "E": if the value is 1, it indicates that the extended field is valid, and, if the value is 0, it indicates that no extended field exists; S: if the value is 1, the serial number in field 9 and field 10 is valid, and, if the value is 0, the serial number in field 9 and field 10 is invalid. PN: if the value is 1, field 11 is valid, and, if the value is 0, field 11 is invalid;

2: Message type;

3, 4: Message length;

5, 6, 7, 8: Tunnel identifier;

9, 10: GTP-U serial number;

11: Serial number; and

12: Extended header type.

Table 2 shows extension of field 12 in Table 1.

TABLE 2

| Octets 1 | Extension Header Length |
|---|---|
| Octets 2 – m | Extension Header Content |
| Octets m + 1 | Next Extension Header Type (note) |

TABLE 3

| Next Extension Header Field Value | Type of Extension Header |
|---|---|
| 0000 0000 | No more extension headers |
| 0000 0001 | MBMS support indication |
| 0000 0010 | MS Info Change Reporting support indication |
| 1100 0000 | PDCP PDU number |
| 1100 0001 | Suspend Request |
| 1100 0010 | Suspend Response |

TABLE 4

| Octets | Bits | | | | | | | |
|---|---|---|---|---|---|---|---|---|
| | 8 | 7 | 6 | 5 | 4 | 3 | 2 | 1 |
| 1 | 1 | | | | | | | |
| 2 | PDCP PDU number | | | | | | | |
| 3 | PDCP PDU number | | | | | | | |
| 4 | Next Extension Header Type (note) | | | | | | | |

It is worthy of attention that the foregoing description is specific to the GTPU V1 protocol. It is understandable to those skilled in the art that for the GTPU V2 protocol, a similar field may be applied.

When the target eNodeB receives a special packet forwarded by the source eNodeB, the target eNodeB knows that the source eNodeB finishes forwarding data, and begins to number the category-3 packets. The target eNodeB assigns PDCP SNs to the category-3 packets in the following way: The target eNodeB assigns PDCP SNs to the category-3 packets according to the order of receiving the category-3 packets on the basis of the maximum PDCP SN of the category-2 packets.

Alternatives after the source eNodeB sends a Relocation Request message to the source MME and before the source MME sends a Handover Command to the source eNodeB, the target eNodeB may start a timer, the timer expiry the numbering of the category-3 packets begins.

An exemplary solution to implementing this embodiment is: It is possible that all the category-1 packets whose PDCP SNs are 1, 2, 3 and 4 in the source eNodeB are sent by the source eNodeB to the UE, but only the category-1 packets whose PDCP SNs are 1 and 4 are responded to. Therefore, the source eNodeB forwards only the category-1 packets whose PDCP SNs are 2 and 3 to the target eNodeB. Every packet processed through the PDCP carries a PDCP SN, for example, carries category-1 packets whose PDCP SNs are 2 and 3; and the packets not processed through the PDCP carry no PDCP SN.

It is possible that the source eNodeB carries not only the category-1 packet processed through the PDCP, but also the category-2 packet not processed through the PDCP. The source eNodeB needs to forward such two types of packets to the target eNodeB.

In this embodiment, if the initial PDCP SN in the newly constructed control message is 5, the target eNodeB assigns "PDCP SN=5, 6, . . . " to the category-2 packets forwarded by the source eNodeB according to the order of receiving the category-2 packets. When the target eNodeB receives a special packet, or when the timer expires, it indicates that the source eNodeB finishes forwarding the category-2 packets. If the PDCP SN of the category-2 packet at this time is 8, the "PDCP SN=9, 10, . . . " are assigned to the category-3 packets on the basis of PDCP SN=8.

Embodiment 5

Figure 6:
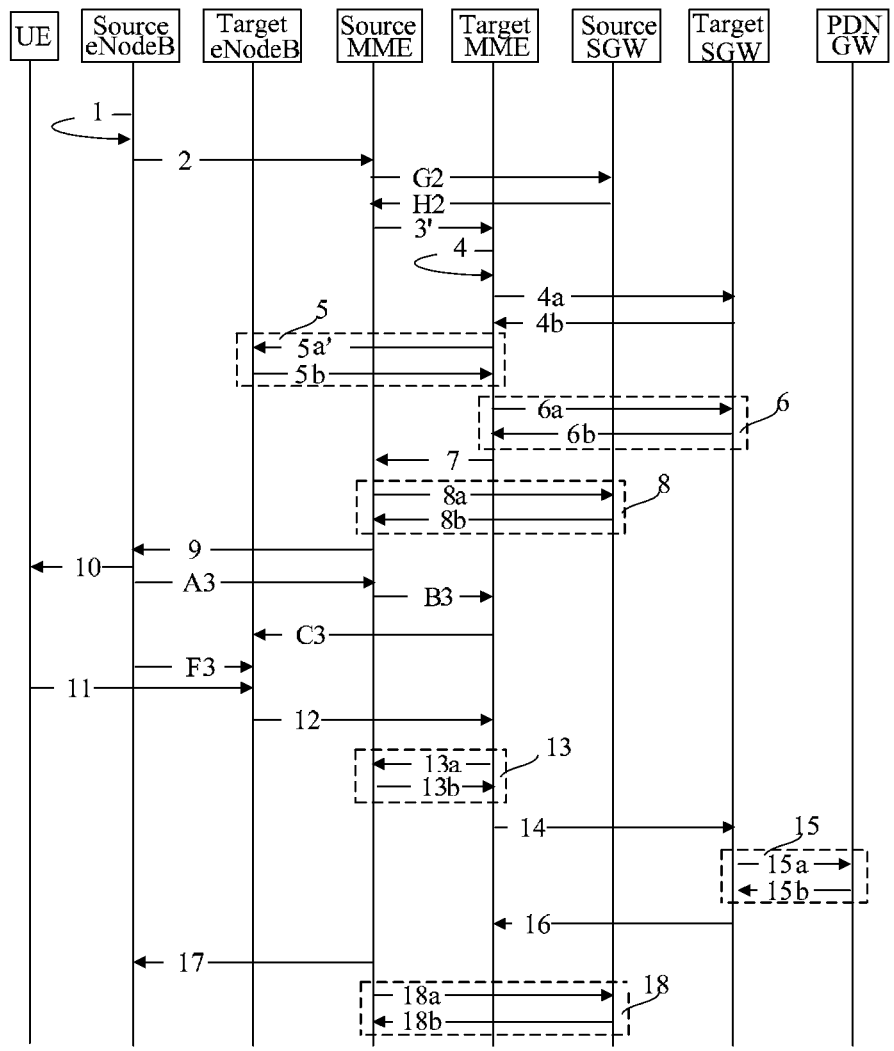
FIG. 6 is a flowchart of a method for forwarding downlink packets based on S1 handover in the fifth embodiment of the present disclosure.

After the source eNodeB sends a Relocation Request message to the source MME and before the source MME sends a Handover Command to the source eNodeB, the following operation may be performed: The source SGW stops sending packets, and obtains the GTP-U SN of the finally forwarded packet. FIG. 6 is a flowchart of a method for forwarding downlink packets based on S1 handover in the fifth embodiment of the present disclosure. The following steps may occur between step 2 and step 3:

Step G2: The source MME instructs the source SGW to stop sending packets.

Step H2: The source SGW answers the source MME, and indicates the GTP-U SN of the packet finally sent to the source eNodeB. In this case, the Relocation Request message carries the GTP-U SN of the packet finally sent by the source SGW to the source eNodeB. That is, the GTP-U SN of the packet initially numbered by the target eNodeB for the category-3 packets.

Step 3': The source MME sends the GTP-U SN to the target MME through a Forward Relocation Request message in step 3 in FIG. 3.

Step 5a': The target MME sends the GTP-U SN to the target MME through the Relocation Request message in step 5a in FIG. 3.

As shown in FIG. 3, after the source eNodeB sends a Handover Command to the UE after step 10, the source eNodeB knows that the connection with the UE is interrupted and the data needs to be forwarded. As shown in FIG. 6, after the source eNodeB sends a Handover Command to the UE in step 10 and before the UE sends a Handover Confirm message to the target eNodeB in step 11, the method further includes:

a newly constructed control message is sent by the source eNodeB through the source MME and the target MME to the target eNodeB; or a newly constructed control message is sent by the source eNodeB through an X2 interface to the target eNodeB directly. The newly constructed control message carries the initial PDCP SN.

The source eNodeB sends the initial PDCP SN through the source MME and the target MME to the target eNodeB, where the initial PDCP SN is the first PDCP SN assigned by the target eNodeB. The detailed steps are as follows:

Step A3: The source eNodeB sends an initial PDCP SN to the source MME.

Step B3: The source MME sends the initial PDCP SN to the target MME.

Step C3: The target MME sends the initial PDCP SN to the target eNodeB.

Alternatively, the source eNodeB sends an initial PDCP SN through an X2 interface to the target eNodeB directly. The detailed steps are as follows:

Step F3: The source eNodeB sends the initial PDCP SN to the target eNodeB.

The target eNodeB assigns PDCP SNs to the category-2 packets in the following way:

The target eNodeB assigns PDCP SNs that begin from the initial PDCP SN to the category-2 packets according to the order of GTP-U SNs of the category-2 packets until the GTP-U SN of the category-2 packet is equal to the GTP-U SN-1 received by the target eNodeB in step 5a'. According to the order of the GTP-U SN of the category-3 packets, the PDCP SNs are assigned to the category-3 packets on the basis of the maximum PDCP SN of the category-2 packets. Alternatively, when the GTP-U SN of the category-3 packet is equal to the GTP-U SN received by the target eNodeB in step 5a', the target eNodeB assigns PDCP SNs to the category-3 packets according to the PDCP SN in C3.

An exemplary solution to implementing this embodiment is: It is possible that all the category-1 packets whose PDCP SNs are 1, 2, 3 and 4 in the source eNodeB are sent by the source eNodeB to the UE, but only the category-1 packets whose PDCP SNs are 1 and 4 are responded to. Therefore, the source eNodeB forwards only the category-1 packets whose PDCP SNs are 2 and 3 to the target eNodeB. Every packet processed through the PDCP carries a PDCP SN, for example, carries category-1 packets whose PDCP SNs are 2 and 3; and the packets not processed through the PDCP carry no PDCP SN.

It is possible that the source eNodeB carries not only the category-1 packet processed through the PDCP, but also the category-2 packet not processed through the PDCP. The category-2 packets need to carry the GTP-U SN. The source eNodeB needs to forward such two types of packets to the target eNodeB.

In this embodiment, if the initial PDCP SN is 5 and the GTP-U SN of the packet finally forwarded by the source eNodeB is 5, the target eNodeB assigns "PDCP SN=5, 6, . . . " to the category-2 packets forwarded by the source eNodeB according to the order of receiving the category-2 packets first. When the PDCP SN of the category-2 packet is 7 and the GUP-U SN of the category-2 packet is 5, it indicates that the source eNodeB finishes forwarding the category-2 packet, and the target eNodeB assigns "PDCP SN=8, 9, . . . " to the category-3 packets according to the order of the GTP-U SN of the category-3 packets on the basis of the maximum PDCP SN of the category-2 packets.

Embodiment 6

The source eNodeB assigns PDCP SNs to all forwarded packets, and makes a mark or a special packet for the packet finally sent to the source eNodeB to indicate the final packet. In this embodiment, a special packet is used to indicate the final packet. At the beginning of relocation, the packet in the source eNodeB may include the category-2 packets not processed through the PDCP. The source eNodeB uses the PDCP to convert them into the category-1 packets numbered with a PDCP SN, and then forwards the packets. That is, all the packets forwarded by the source eNodeB to the target eNodeB are category-1 packets. The packets received by the target eNodeB include the category-1 packets forwarded by the source eNodeB and the category-3 packets delivered by the target SGW.

After the source eNodeB sends a Relocation Request message to the source MME and before the source MME sends a Handover Command to the source eNodeB, the following operations may be performed: The source SGW stops sending packets, and affixes a label to the final packet, or makes a special packet for the final packet and sends it to the source eNodeB. The source eNodeB may forward the special packet, or construct a new special packet and sends it to the target eNodeB. In order to avoid loss of user plane data, the special packet may be sent repeatedly in series. For example, for the GTPU V1 protocol, in order to construct a special packet in this solution, field 12 or field 11 in Table 1 may be marked as a special packet, and the special packet is set according to Table 3. The field in Table 4 includes a PDCP SN. It is worthy of attention that the foregoing description is specific to the GTPU V1 protocol. It is understandable to those skilled in the art that for the GTPU V2 protocol, a similar field may be applied.

Figure 7:
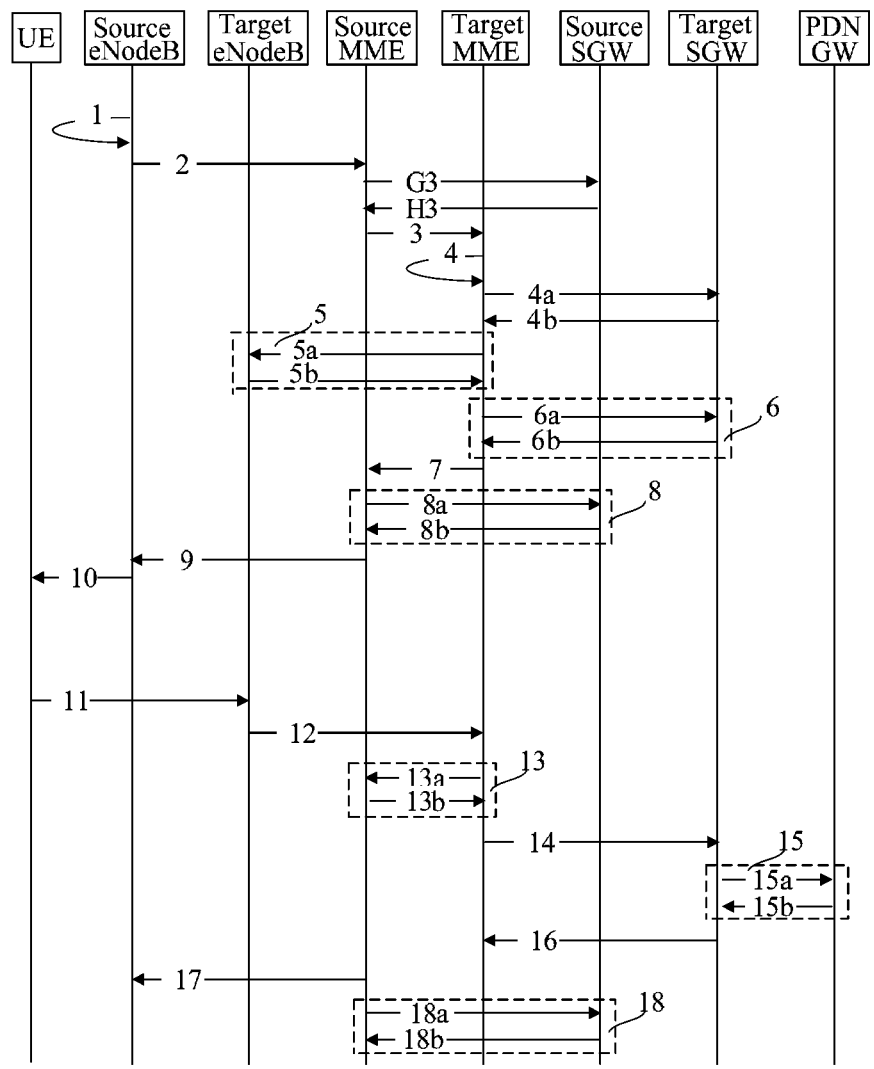
FIG. 7 is a flowchart of a method for forwarding downlink packets based on S1 handover in the sixth embodiment of the present disclosure.

FIG. 7 is a flowchart of a method for forwarding downlink packets based on S1 handover in the sixth embodiment of the present disclosure. The following steps may occur between step 2 and step 3:

Step G3: The source MME instructs the source SGW to stop sending packets.

Step H3: The source SGW answers the source MME.

The source eNodeB numbers the received packet with a PDCP SN, and then numbers the special packet with a PDCP SN.

After receiving the special packet from the source eNodeB, the target eNodeB knows that the source eNodeB finishes forwarding the packets. The target eNodeB numbers the delivered packets by using PDCP SN of the special packet as an initial PDCP SN.

An exemplary solution to implementing this embodiment is: At the time of relocation, the source SGW sends three packets and a special packet to the source eNodeB. The source eNodeB assigns PDCP SNs to the four packets with "PDCP SN=1, 2, 3, 4". After receiving the packets whose PDCP SNs are 1, 2 and 3, the target eNodeB knows that they are forwarded packets, and send the packets to the UE according to "PDCP SN=1, 2, 3". After receiving the packet whose PDCP SNs is 4, the target eNodeB knows that it is a special packet, and does not send the packet to the UE. According to the special packet, the target eNodeB knows that the source eNodeB finishes forwarding the data, and can start numbering the packet delivered by the target SGW with "PDCP SN=4".

In the process of forwarding the downlink packets, the target eNodeB needs to notify the UE of the packet state report information. The UE sends the packet according to the packet state report information. The following embodiments 7-9 describe a method for forwarding uplink packets based on S1 handover.

In the foregoing methods for forwarding downlink packets based on S1 handover, the target eNodeB numbers the packets that are received by the target eNodeB and carry no PDCP SN according to the received message that carries PDCP SN information of the packet, or the newly constructed control message sent by the control plane, or the special packet. Therefore, the UE can receive all packets sequentially in the case of S1 handover, and the downlink packets can be forwarded without loss.

Embodiment 7

Figure 8:
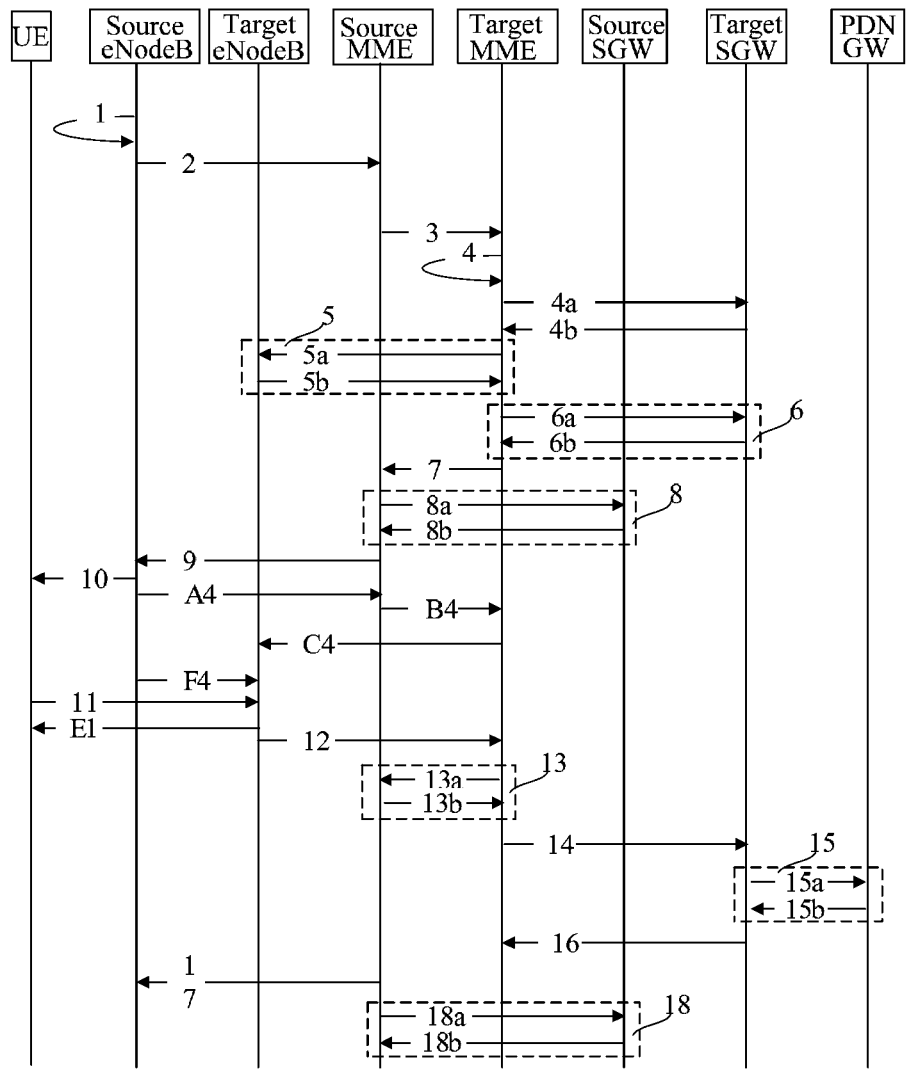
FIG. 8 is a flowchart of a method for forwarding uplink packets based on S1 handover in the seventh embodiment of the present disclosure.

FIG. 8 is a flowchart of a method for forwarding uplink packets based on S1 handover in the seventh embodiment of the present disclosure. In this embodiment, the packet state report information includes the PDCP SN of the packet finally sent by the source eNodeB. The PDCP SN of the packet finally and successfully sent by the source eNodeB to the SGW may be conveyed by a newly constructed control message, the newly constructed control message sent by the source eNodeB through the source MME and the target MME to the target eNodeB; or a newly constructed control message sent by the source eNodeB through an X2 interface to the target eNodeB directly.

As shown in FIG. 3, after the source eNodeB sends a Handover Command to the UE after step 10, the source eNodeB knows that the connection with the UE is interrupted and the data needs to be forwarded. As shown in FIG. 8, after the source eNodeB sends a Handover Command to the UE in step 10 and before the UE sends a Handover Confirm message to the target eNodeB in step 11, the method further includes: a newly constructed control message is sent by the source eNodeB through the source MME and the target MME to the target eNodeB; or a newly constructed control message is sent by the source eNodeB through an X2 interface to the target eNodeB directly. The newly constructed control message carries the PDCP SN of the packet finally sent by the source eNodeB. Meanwhile, the source eNodeB discards the packets which do not arrive sequentially.

Specifically, the source eNodeB sends the target eNodeB the PDCP SN of the packet that is finally and successfully sent by the source eNodeB to the SGW through the source MME and the target MME in the following way:

Step A4: The source eNodeB sends the source MME the PDCP SN of the packet that is finally and successfully sent by the source eNodeB to the SGW.

Step B4: The source MME sends the target MME the PDCP SN of the packet that is finally and successfully sent by the source eNodeB to the SGW.

Step C4: The target MME sends the target MME the PDCP SN of the packet that is finally and successfully sent by the source eNodeB to the SGW.

Alternatively, the source eNodeB directly sends the target eNodeB the PDCP SN that is finally and successfully sent by the source eNodeB through an X2 interface to the SGW. The detailed steps are as follows:

Step F4: The source eNodeB sends the target eNodeB the PDCP SN of the packet that is finally and successfully sent by the source eNodeB to the SGW.

Step E1: The target eNodeB sends the packet state report information to the UE. The packet state report information carries the maximum PDCP SN of the successfully sent packets, where the maximum PDCP SN is the PDCP SN of the packet finally sent by the source eNodeB to the source SGW. The UE sends the packets subsequent according to this PDCP SN and state report to the target eNodeB.

An exemplary solution to implementing this embodiment is: In the relocation, the source eNodeB receives the packets whose PDCP SNs are 1, 3 and 4, and receives no packet whose PDCP SNs is 2. Therefore, the source eNodeB sends the packet whose PDCP SNs is 1 to the source SGW. The source eNodeB tells the target eNodeB the maximum PDCP SN=1 sent by the source eNodeB to the source SGW. Therefore, the target eNodeB tells the UE to send the packets whose PDCP SNs are 2, 3, 4 . . . . The UE sends the packets whose PDCP SNs are 2, 3, 4, . . . to the target eNodeB.

In this solution, the PDCP SN sent by the source eNodeB to the target eNodeB may be the PDCP SN successfully sent to the source SGW plus 1. In the given example, the PDCP SN may be 2. In this case, the target eNodeB knows that the source eNodeB requires the retransmission to start from PDCP SN=2, and the target eNodeB tells the UE to start sending data from 2.

Embodiment 8

Figure 9:
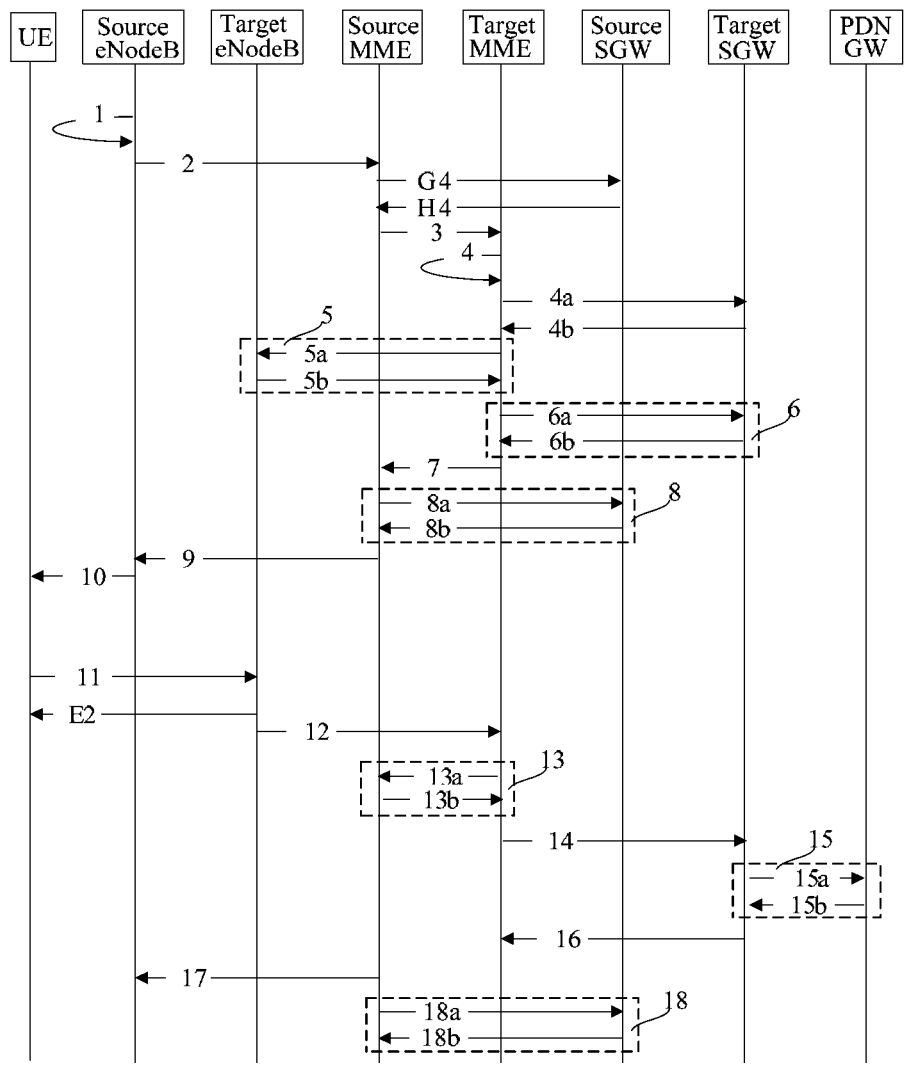
FIG. 9 is a flowchart of a method for forwarding uplink packets based on S1 handover in the eighth embodiment of the present disclosure.

FIG. 9 is a flowchart of a method for forwarding uplink packets based on S1 handover in the eighth embodiment of the present disclosure. In this embodiment, the packet state report information includes: the PDCP SN of the special packet sent by the source eNodeB to the target eNodeB.

As shown in FIG. 3, after the source eNodeB sends a Handover Command to the UE after step 10, the source eNodeB knows that the connection with the UE is interrupted and the data needs to be forwarded.

After the source eNodeB sends a Relocation Request message to the source MME and before the source MME sends a Handover Command to the source eNodeB, the following operations may be performed: The source SGW stops sending packets, and starts to send a special packet to the source eNodeB. The PDCP SN of the special packet is equal to the PDCP SN of the packet finally sent by the source eNodeB. Meanwhile, the source eNodeB discards the packets that do not arrive sequentially. The source SGW constructs a special packet and sends it to the source eNodeB. The source eNodeB may forward the special packet, or construct a new special packet and sends it to the target eNodeB. In order to avoid loss of user plane data, the special packet may be sent repeatedly in series. For example, for the GTPU V1 protocol, in order to construct a special packet in this solution, field 12 or field 11 in Table 1 may be marked as a special packet, and the special packet is set according to Table 3. The field in Table 4 includes a PDCP SN. It is worthy of attention that the foregoing description is specific to the GTPU V1 protocol. It is understandable to those skilled in the art that for the GTPU V2 protocol, a similar field may be applied.

As shown in FIG. 9, the following steps may occur between step 2 and step 3:

Step G4: The source MME instructs the source SGW to stop sending packets.

Step H4: The source SGW answers the source MME.

Step E2: When the target eNodeB receives the special packet, the target eNodeB instructs the UE to send the initial PDCP SN of the packet, where the initial PDCP SN is the PDCP SN of the special packet.

An exemplary solution to implementing this embodiment is: In the relocation, the source eNodeB receives the packets whose PDCP SNs are 1, 3 and 4, and receives no packet whose PDCP SNs is 2. Therefore, the source eNodeB sends the packet whose PDCP SNs is 1 to the source SGW. In this case, the source SGW constructs a special packet and sends it to the source eNodeB. The source eNodeB sends the special packet to the target eNodeB. The PDCP SN of the special packet is set to be the PDCP SN finally sent to the source SGW plus 1. The target eNodeB receives the special packet. If the PDCP SN of the special packet is 2, the initial PDCP SN of the packet to be sent by the UE is 2. Therefore, the target eNodeB tells the UE to send the packets whose PDCP SNs are 2, 3, 4, . . . . The UE sends the packets whose PDCP SNs are 2, 3, 4, . . . to the target eNodeB.

In this solution, the PDCP SN of the special packet may also be the PDCP SN successfully sent to the source SGW.

In the given example, the PDCP SN of the special packet may be 1. The target eNodeB and the source eNodeB reach a consensus, and know that the UE needs to start resending data from the PDCP SN+1.

Embodiment 9

Figure 10:
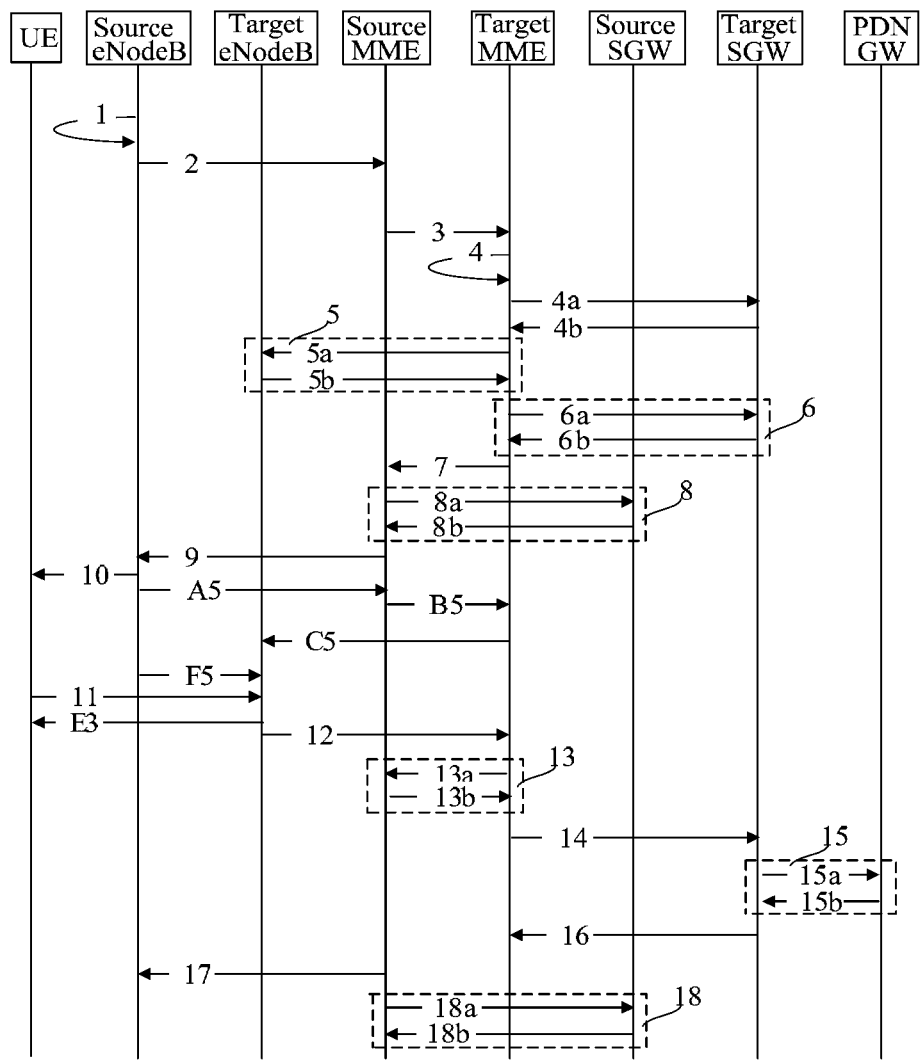
FIG. 10 is a flowchart of a method for forwarding uplink packets based on S1 handover in the ninth embodiment of the present disclosure.

FIG. 10 is a flowchart of a method for forwarding uplink packets based on S1 handover in the ninth embodiment of the present disclosure. In this embodiment, the packet state report information includes: the PDCP SNs of the packets not received by the source eNodeB, and the PDCP SN of the packets required to be sent sequentially.

As shown in FIG. 3, after the source eNodeB sends a Handover Command to the UE after step 10, the source eNodeB knows that the connection with the UE is interrupted and the data needs to be forwarded. As shown in FIG. 10, after the source eNodeB sends a Handover Command to the UE in step 10 and before the UE sends a Handover Confirm message to the target eNodeB in step 11, the method further includes:

A newly constructed control message is sent by the source eNodeB through the source MME and the target MME to the target eNodeB; or a newly constructed control message is sent by the source eNodeB through an X2 interface to the target eNodeB directly.

The newly constructed control message carries the PDCP SNs of the packets not received by the source eNodeB and the initial PDCP SN of the packets required to be sent sequentially.

The source eNodeB sends the PDCP SN through the source MME and the target MME to the target eNodeB. The detailed steps are as follows:

Step A5: The source eNodeB sends the source MME the PDCP SNs of the packets not received by the source eNodeB and the initial PDCP SN of the packets required to be sent sequentially.

Step B5: The source MME sends the target MME the PDCP SNs of the packets not received by the source eNodeB and the initial PDCP SN of the packets required to be sent sequentially.

Step C5: The target MME sends the target eNodeB the PDCP SNs of the packets not received by the source eNodeB and the initial PDCP SN of the packets required to be sent sequentially.

Alternatively, through an X2 interface directly, the source eNodeB sends the target eNodeB the PDCP SNs of the packets not received by the source eNodeB and the initial PDCP SN of the packets required to be sent sequentially. The detailed steps are as follows:

Step F5: The source eNodeB sends the target eNodeB the PDCP SNs of the packets not received by the source eNodeB and the initial PDCP SN of the packets required to be sent sequentially.

Step E3: The target eNodeB sends the packet state report information to the UE. The UE sends the packets according to the packet state report information. The packet state report information includes: the PDCP SNs of the packets not received by the source eNodeB, and the PDCP SNs of the packets required to be sent sequentially.

An exemplary solution to implementing this embodiment is: In the relocation, the source eNodeB receives the uplink packets whose PDCP SNs are 1, 3 and 4, and receives no packet whose PDCP SN is 2. Therefore, the source eNodeB sends the packet whose PDCP SN is 1 to the source SGW, and forwards the packets whose PDCP SNs are 3 and 4 to the target eNodeB. The source eNodeB tells the target eNodeB that the source eNodeB receives no packet whose PDCP SN is 2 and tells the target eNodeB to start sending the packets sequentially from PDCP SN=5. Therefore, the target eNodeB tells the UE to resend the packet whose PDCP SN is 2 and sequentially send the packets which start from PDCP SN=5. The UE sends the packet whose PDCP SN is 2 to the target eNodeB and sequentially sends the packets which start from PDCP SN=5. After receiving the packet whose PDCP SN is 2, the target eNodeB sequentially sends the packets whose PDCP SNs are 2, 3 and 4 to the SGW, and sequentially sends the packets whose PDCP SNs are equal to or greater than 5.

In the foregoing method for forwarding uplink packets based on S1 handover, the target eNodeB sends the packet state report information to the UE. Therefore, the UE knows the packets not received by the source eNodeB or the PDCP SNs of such packets accurately in the case of S1 handover and sends the packets according to the packet state report information, and the uplink packets are forwarded without loss.

Figure 11:
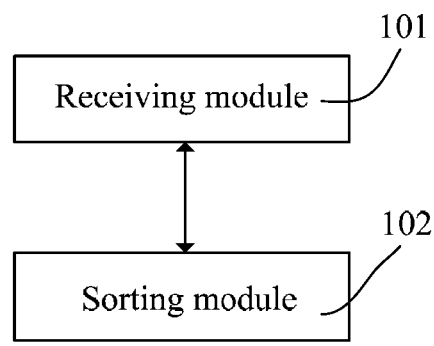
FIG. 11 shows a structure of an eNodeB in an embodiment of the present disclosure.

In order to implement the method for forwarding downlink packets based on S1 handover, an eNodeB is disclosed in an embodiment of the present disclosure. FIG. 11 shows a structure of an eNodeB in an embodiment of the present disclosure. As shown in FIG. 11, when the eNodeB serves as a target eNodeB, the eNodeB includes:

a receiving module 101, adapted to receive the message that carries PDCP SN information of the packet; and a sorting module 102, connected with the receiving module 101 and adapted to perform PDCP SN numbering for the packet according to the message.

In the foregoing embodiment, the message that carries the PDCP SN information of a packet is a newly constructed control message sent by the source eNodeB through the source MME and the target MME. The newly constructed control message may include: the initial PDCP SN assigned by the target eNodeB, and the GTP-U SN corresponding to the initial PDCP SN. Alternatively, the newly constructed control message may include only the initial PDCP SN assigned by the target eNodeB to the packet.

In the foregoing embodiment, the message that carries the PDCP SN information of a packet is a Relocation Request message sent by the source eNodeB through the source MME and the target MME. The Relocation Request message carries the information about the relationship between the PDCP SN and the GTP-U SN.

In the foregoing embodiment, the message that carries the PDCP SN information of a packet is a Handover Confirm message sent by the UE. This message carries the maximum PDCP SN of the packet received by the UE.

It is understandable to those skilled in the art that all or part of the steps of the foregoing embodiments may be implemented by hardware including a processor instructed by a program. The program may be stored in a computer-readable storage medium accessible by the processor. When being executed, the program instructs the processor to perform these steps: numbering a packet not processed by using PDCP according to a message that carries PDCP SN information if downlink packets to be forwarded include the packet not processed by using PDCP; and sending the downlink packets to the UE according to the PDCP SN corresponding to the packet included in the downlink packets.

Alternatively, the program performs these steps when being executed: numbering a packet not processed by using PDCP according to a message that carries PDCP Serial Number (SN) information if downlink packets to be forwarded include the packet not processed by using PDCP; and sending the downlink packets to the UE according to the PDCP SN corresponding to the packet included in the downlink packets. Alternatively, the program performs these steps when being executed: receiving state report information of the packet sent by the target eNodeB; and sending the packet according to the state report information of the packet.

The storage medium may be a magnetic disk, compact disk, Read-Only Memory (ROM), Random Access Memory (RAM), and so on.

Although the disclosure is described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A method for forwarding downlink data packets during a handover for a user equipment (UE), comprising:
   receiving, by a target evolved NodeB (eNodeB), a plurality of downlink data packets, wherein the plurality of data packets at least includes a first data packet without Packet Data Convergence Protocol (PDCP) processing (a first non-PDCP data packet) sent from a source eNodeB and a second data packet without PDCP processing (a second non-PDCP data packet) sent from a serving gateway (S-GW);
   receiving, by the target eNodeB, a control message from the source eNodeB through a mobility management entity (MME), the control message including an initial PDCP serial number (SN);
   receiving, by the target eNodeB, a special packet sent by the source eNodeB, the special packet lacking any user data and being without a PDCP SN;
   processing, by the target eNodeB, the plurality of downlink data packets into PDCP data packets by numbering the plurality of downlink data packets with PDCP SNs according to the initial PDCP SN included in the received control message, wherein the first non-PDCP data packet is processed by the target eNodeB into a first PDCP data packet before the special packet is received, the second non-PDCP data packet is processed by the target eNodeB into a second PDCP data packet after the special packet is received; and
   sending, by the target eNodeB, the first PDCP data packet and the second PDCP data packet to the UE.

2. The method according to claim 1, wherein the special packet is received by the source eNodeB from the SGW.

3. The method according to claim 1, wherein the special packet is generated by the source eNodeB.

4. The method according to claim 1, wherein the control message is sent from the source eNodeB to the target eNodeB through a MME further comprising: the control message is sent from the source eNodeB to the target eNodeB through a source MME and a target MME.

5. The method according to claim 1, wherein the special packet indicating no more data packets to be sent from the S-GW to the source eNodeB.

6. An evolved NodeB (eNodeB), wherein the eNodeB is a target eNodeB during a handover of a user equipment (UE), the target eNodeB comprising:
   a receiver, configured to receive a plurality of downlink data packets, wherein the plurality of data packets at least includes a first data packet without Packet Data Convergence Protocol (PDCP) processing (a first non-PDCP data packet) sent from a source eNodeB and a second data packet without PDCP processing (a second non-PDCP data packet) sent from a serving gateway (S-GW), receive a control message from the source eNodeB through a mobility management entity (MME), and receive a special packet sent by the source eNodeB, wherein the control message includes an initial packet data convergence protocol serial number (PDCP SN), the special packet lacking any user data and being without a PDCP SN;
   a processor, configured to perform processing the plurality of downlink data packets into PDCP data packets by numbering the plurality of downlink data packets with PDCP SNs according to the initial PDCP SN included in the received control message, wherein the first non-PDCP data packet is processed by the processor into a first PDCP data packet before the special packet is received, the second non-PDCP data packet is processed by the processor into a second PDCP data packet after the special packet is received; and
   a transmitter, configured to send the first PDCP data packet and the second PDCP data packet to the UE.

7. The eNodeB according to claim 6, wherein the special packet is received by the source eNodeB from the SGW.

8. The eNodeB according to claim 6, wherein the special packet is generated by the source eNodeB.

9. The eNodeB according to claim 6, wherein the receiver is further configured to receive the control message through a source MME and a target MME.

10. The eNodeB according to claim 6, the special packet indicating no more data packets are sent from the S-GW to the source eNodeB.

* * * * *